US005532788A

United States Patent [19]

Monroe

[11] Patent Number: 5,532,788

[45] Date of Patent: *Jul. 2, 1996

[54] METHOD FOR MAKING SPORTSCARDS

[76] Inventor: Kenneth H. Monroe, 32758 Birchwood, Westland, Mich. 48185

[ * ] Notice: The term of this patent shall not extend beyond the expiration date of Pat. No. 5,369,467.

[21] Appl. No.: 344,078

[22] Filed: Nov. 23, 1994

Related U.S. Application Data

[63] Continuation-in-part of Ser. No. 133,884, Oct. 12, 1993, Pat. No. 5,369,467.

[51] Int. Cl.[6] .......... G03B 27/32; G03B 27/44

[52] U.S. Cl. .......... 355/77; 428/14; 428/187; 428/195; 428/542.4

[58] Field of Search .......... 428/13, 14, 542.4, 428/187, 195; 355/77

[56] References Cited

U.S. PATENT DOCUMENTS

| | | | |
|---|---|---|---|
| 3,635,558 | 1/1972 | LePeer et al. | 40/152 X |
| 4,325,632 | 4/1982 | Tsuji et al. | 355/86 |
| 4,382,676 | 5/1983 | Ohta et al. | 355/75 |
| 4,468,116 | 8/1984 | Miyasaka | 355/54 |
| 4,866,476 | 9/1989 | Kogane et al. | 355/40 |
| 4,889,749 | 12/1989 | Ohashi et al. | 428/13 |
| 4,890,402 | 1/1990 | Carroll | 428/14 X |
| 4,908,657 | 3/1990 | Kogane | 355/75 |
| 4,918,483 | 4/1990 | Otake | 355/40 |
| 4,959,683 | 9/1990 | Otake et al. | 355/28 |
| 4,977,061 | 12/1990 | Suganuma | 430/203 |
| 4,991,336 | 2/1991 | Lucke | 428/13 X |
| 5,072,253 | 12/1991 | Patton | 355/40 |
| 5,270,101 | 12/1993 | Helicher | 428/542.4 X |
| 5,294,279 | 3/1994 | Kuhns et al. | 428/13 X |
| 5,369,467 | 11/1994 | Monroe | 428/542.4 X |

*Primary Examiner*—Henry F. Epstein
*Attorney, Agent, or Firm*—Charles W. Chandler

[57] ABSTRACT

A method for making a plurality of colored sportscards comprising the steps of forming a master panel with a matrix of borders, each associated with a window area; cutting each window area into a window opening; pasting a photograph behind each window opening; making a colored photocopy of the master panel and the colored photographs; disposing a back panel on the rear of the photocopied panel having indicia related to each of the images within the photocopied window openings, laminating the two panels between a pair of adhesive clear plastic sheets; and then cutting the laminated panels into as many sub panels as there are window openings to form a plurality of sportscards.

2 Claims, 4 Drawing Sheets

METHOD FOR MAKING SPORTSCARDS

CROSS-REFERENCE TO RELATED APPLICATION

This application is a continuation-in-part of application Ser. No. 08/133,884 filed Oct. 12, 1993 and since issued as U.S. Pat. No. 5,369,467 on Nov. 29, 1994.

BACKGROUND OF THE INVENTION

In my aforementioned patent application, I disclosed a card that may be used either for sports images or other images in which a pair of panels are joined together, a front panel having a color photocopy image of a photograph, and a back panel pasted to the rear of the photocopy.

SUMMARY OF THE INVENTION

The broad purpose of the present invention is to provide an inexpensive method for making low volume sportscards. A master panel is printed with a matrix of borders, each outlining a window area, using a computer and printer apparatus. An opening is cut in each window. A photograph is mounted behind each window. A color photocopy is made of the master panel and the photograph. A back panel is pasted to the rear of the photocopy. The back panel has information related to the photocopied image within each of the window areas.

The two panels are then laminated between two clear plastic sheets. The laminated panel is then cut into as many sub panels as there are windows to form several sportscards. The process is repeated until each athlete's photograph has been made into as many sportscards as desired. The laminated product not only is long lasting, but is stiffer than other commercial products.

The process can be used for making cards for individuals other than athletes, or or non-sport events.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views.

DESCRIPTION OF THE PREFERRED EMBODIMENT

The inventive method comprises a technique for making either one or several sportscards of athletes and then repeating the process as many times as necessary to provide a sufficient number of cards for each individual athlete. The process is not limited to sportscards but can be used for creating cards of other images such as children, infants, weddings, and other special events.

Figure 1:
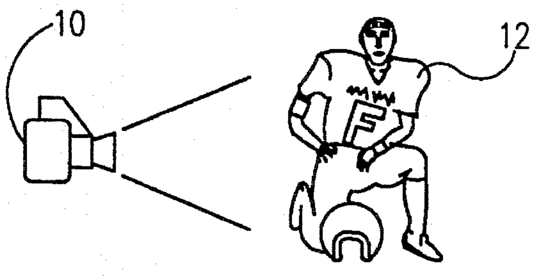
FIG. 1 illustrates an amateur athlete being photographed to provide a color photograph.

Referring to FIG. 1, the first step comprises employing a camera 10 for taking the color photograph of an individual such as athlete 12. For illustrative purposes, eight individual athletes are photographed to make eight color photographs 14*a*, 14*b*, 14*c*, 14*d*, 14*e*, 14*f*, 14*g* and 14*h*. Each color photograph is preferably 2½" wide and 3⁵⁄₁₆" tall.

Figure 2:
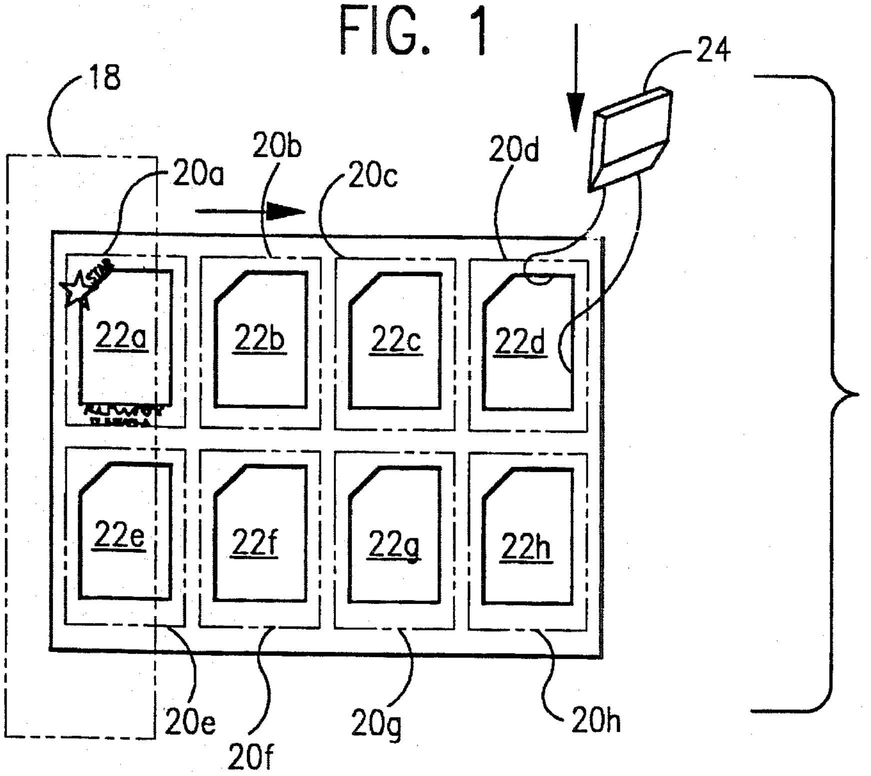
FIG. 2 illustrates a master panel having its front side printed with borders for window areas, and then having each window area die cut to form a window opening.
Figure 3:
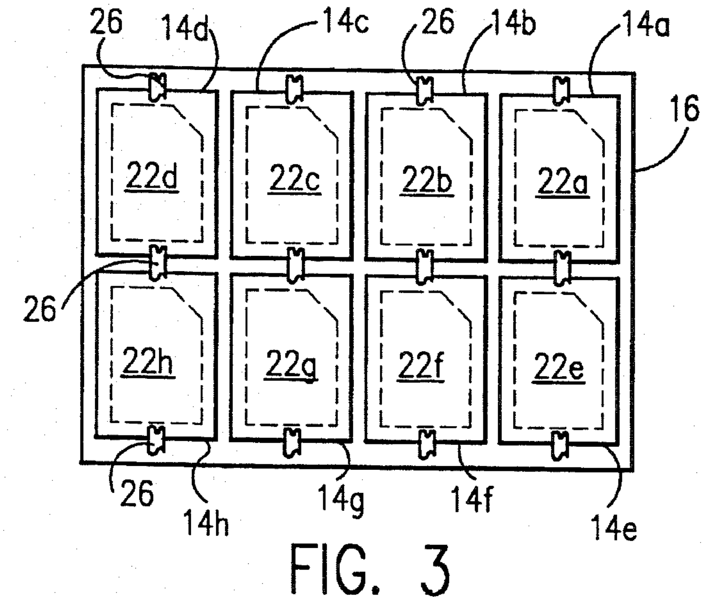
FIG. 3 is a view of the rear side of the master panel with photographs taped over each window opening.

Referring to FIGS. 2 and 3, with a supply of photographs on hand, the user then prepares a master panel 16 which, for example, may be a paper sheet used in color computer printers. A computer laser printer 18 is preferred. A computer program, such as "Pagemaker" is employed in the appropriate computer apparatus so that laser printer 18 prints eight individualized borders 20*a*, 20*b*, 20*c*, 20*d*, 20*e*, 20*f*, 20*g*, and 20*h*, in a matrix on panel 16. The borders may be identical or individualized.

Each border includes indicia identifying the particular athlete whose photograph is being used within the border. The eight borders circumscribe eight generally rectangular window areas 22*a*, 22*b*, 22*c*, 22*d*, 22*e*, 22*f*, 22*g*, and 22*h*. Each window area has an area less than the area of it's corresponding photograph. Each window has a height 2⅝" and width of 1⅞".

Die cutting means 24 are then employed for cutting a window opening in each window area. Each window area thus becomes a window opening having an area less than that of it's corresponding photograph. The eight photographs are then located behind the master panel so that photograph 14*a* is behind window opening 22*a*, photograph 14*b* is behind window opening 22*b*, and so forth. Each photograph is located behind its respective window opening to best illustrate the image contained in the photograph. It can be seen in FIG. 3 that the edge of each photograph overlaps the edge of its corresponding window opening.

Tape means 26 are then employed for attaching each photograph in its location behind its respective window opening so that the colored image of the photograph is visible through the corresponding opening.

Figure 4:
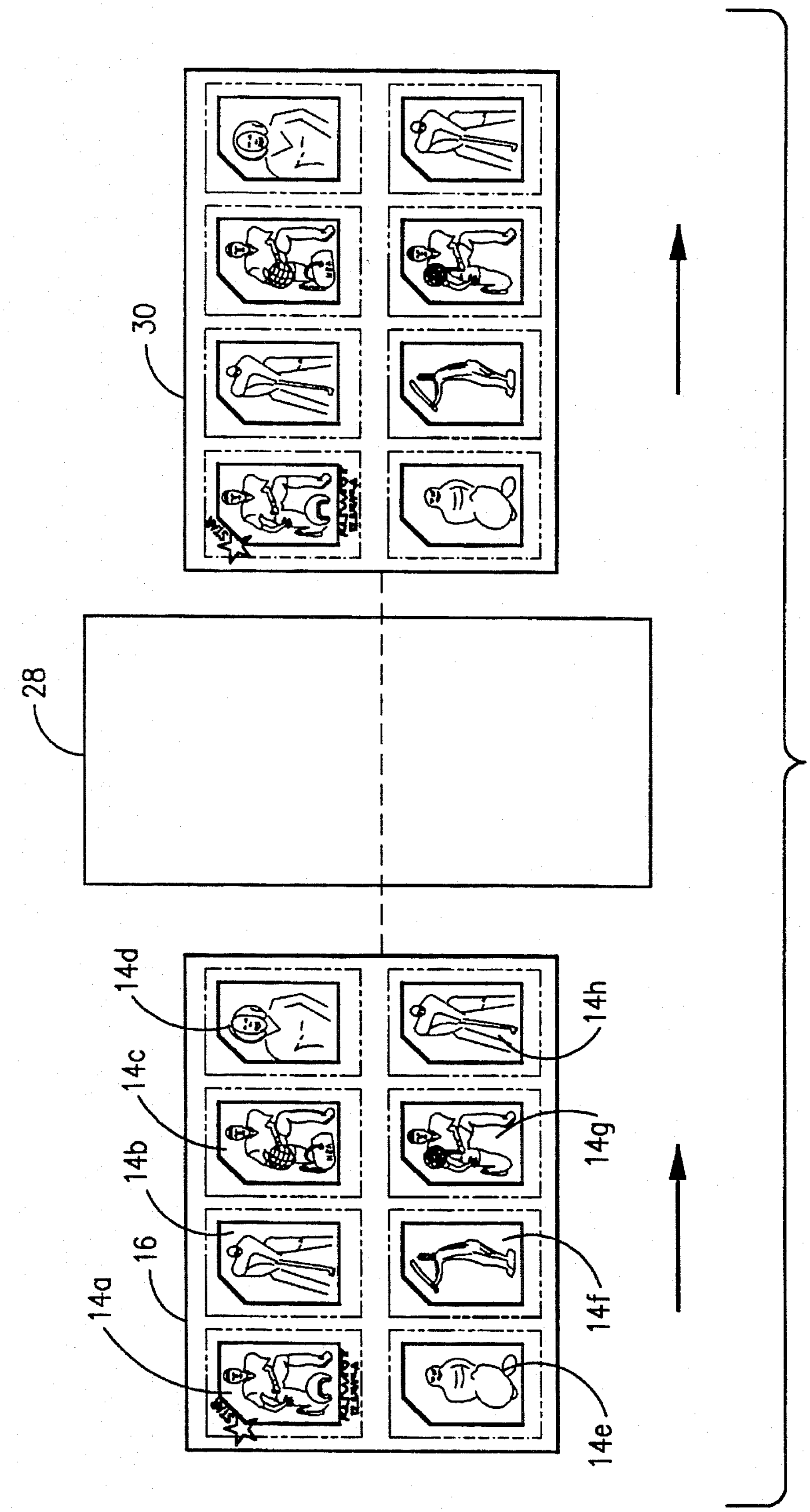
FIG. 4 illustrates the master panel being passed through photocopy apparatus to produce a photocopy of the front face of the master panel.

Referring to FIG. 4, master panel 16 and the eight attached photographs are processed through a color photocopy apparatus 28 to provide a photocopied front panel 30 which is a single layer panel having the eight photographs in a photocopy form.

Figure 5:
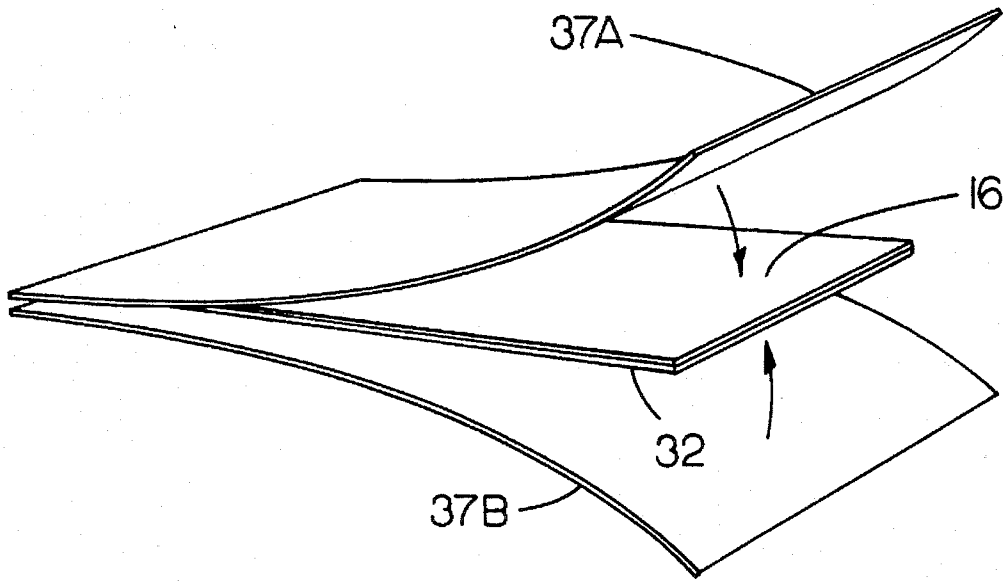
FIG. 5 illustrates the front and rear panels being laminated between clear sheets of plastic.
Figure 6:
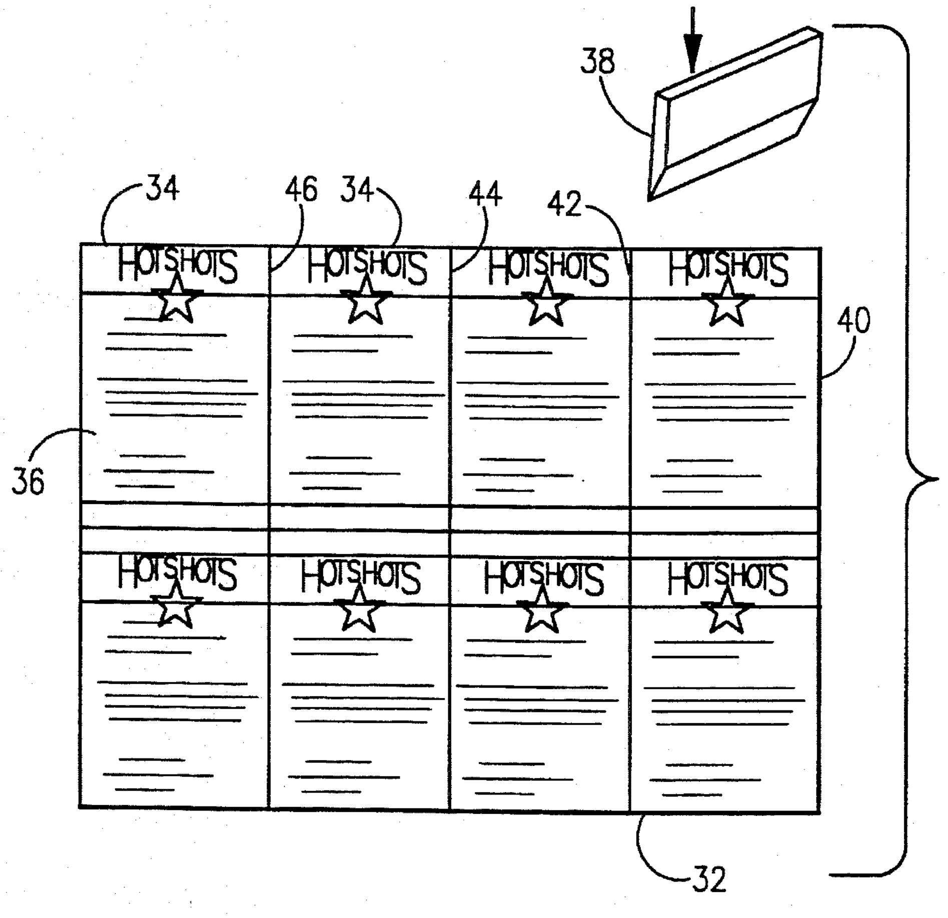
FIG. 6 is a rear view of the laminated panel being die cut into eight sub panels.

Referring to FIG. 5, a rear panel 32 is printed on a computer. The rear panel may be of a suitable cardstock and is printed with indicia material 34 that is common to each of the eight cards, such as the trademark "Hotshots", and individual information such as at 36, which is unique to the particular card with which it is associated. The rear panel is then adhered through the use of a suitable adhesive to the rear face of panel 30 so that each of the rear sub panels, such as 36, is behind its associated photocopied photograph.

Referring to FIG. 5, the two panels are laminated between a pair of clear plastic sheets 37*a* and 37*b*. The plastic sheets may be conventional plastic laminations with an adhesive on the sides of the clear plastic sheets facing panels 16 and 32, and overlapping the two panels. The two plastic sheets are adhesively attached to the two panels as well to each other about ¼" beyond the border of the two panels. The two sheets are preferably about 0.005" thick thus permitting panels 16 and 32 to be a relatively thin paper stock. The clear plastic sheets provide sufficient stiffness for the laminated end product as well as providing a long wearing product.

Figure 7:
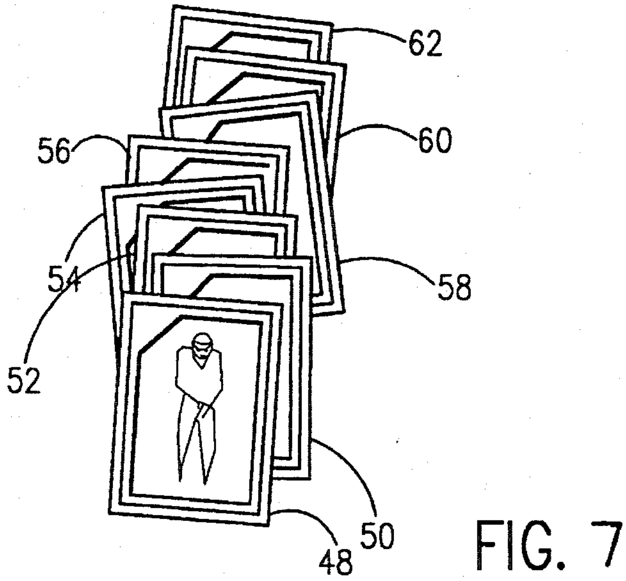
FIG. 7 illustrates the eight finished sportscards.

Die cut means 38 is then employed to cut laminated panel 40 along lines 40, 42, 44 and 46 to form eight sub panels or sportscards 48, 50, 52, 54, 56, 58, 60 and 62 illustrated in FIG. 7. Each sportscard is unique to the individual's image illustrated on the card.

The process is then repeated for as many sportscards as each individual desires. For example, if each individual orders ten sportscards, the process is then repeated nine times.

Thus, it is to be understood that I have described an economical method for making sportscards of athletes in a low volume technique, having high quality images.

Having described my invention, I claim:

1. A method for making a plurality of individual cards, such as sportscards, each card having printed indicia material common to all of the plurality of cards, and each card bearing a colored photographed image exclusive to the individual card, comprising the steps of:

making a master panel having a front side and a rear side;

printing on the front side of the master panel borders for a plurality of window areas;

cutting the master panel around each window area to form a plurality of window openings;

locating a photograph adjacent the rear side of the master panel behind each window opening such that the subject matter of the photograph is visible through the window opening;

disposing each photograph on the rear side of the master panel;

photocopying the front of the master panel and that portion of each photograph visible through each window to form a photocopied panel;

laminating the photocopied panel between two sheets of clear plastic, and adhesively attaching the sheets of clear plastic to the photocopied panel to form a laminated panel; and cutting the laminated panel into as many sub panels as there are photographed images thereon.

2. A method as defined in claim 1, including the step of forming a back panel with individual indicia material related to each of the photographs, and disposing the back panel to the rear of the photocopied panel before laminating the photocopied panel.

* * * * *